United States Patent
Jones

(10) Patent No.: US 11,158,152 B2
(45) Date of Patent: Oct. 26, 2021

(54) ELECTRO HOT SPOT VENDING MACHINE

(71) Applicant: Charlie Jones, Portsmouth, VA (US)

(72) Inventor: Charlie Jones, Portsmouth, VA (US)

(73) Assignee: Charlie Ellis Jones, Portsmouth, VA (US)

( * ) Notice: Subject to any disclaimer, the term of this patent is extended or adjusted under 35 U.S.C. 154(b) by 0 days.

(21) Appl. No.: 15/097,404

(22) Filed: Apr. 13, 2016

(65) Prior Publication Data

US 2016/0300424 A1 Oct. 13, 2016

Related U.S. Application Data

(60) Provisional application No. 62/178,503, filed on Apr. 13, 2015.

(51) Int. Cl.
*G07F 15/00* (2006.01)
*G06Q 50/06* (2012.01)
*G06Q 20/14* (2012.01)

(52) U.S. Cl.
CPC ......... *G07F 15/006* (2013.01); *G06Q 20/145* (2013.01); *G06Q 50/06* (2013.01); *G07F 15/003* (2013.01); *G07F 15/005* (2013.01); *Y02T 90/12* (2013.01)

(58) Field of Classification Search
CPC .................................................... G07F 15/006
USPC ................... 235/381; 455/406; 194/344, 215; 705/27.1
See application file for complete search history.

(56) References Cited

U.S. PATENT DOCUMENTS

| | | | | |
|---|---|---|---|---|
| 2007/0118437 A1* | 5/2007 | Perrault | ............. | G06Q 30/0641 705/27.1 |
| 2007/0125104 A1* | 6/2007 | Ehlers | ................... | F25D 27/005 62/157 |
| 2009/0212967 A1* | 8/2009 | Bonasia | ................. | H02H 3/335 340/4.32 |
| 2010/0078290 A1* | 4/2010 | Chang | .................... | G07F 9/026 194/206 |
| 2011/0084651 A1* | 4/2011 | Caskey | ................ | H01R 25/006 320/107 |
| 2012/0285794 A1* | 11/2012 | Upton | ....................... | G07F 5/02 194/344 |
| 2013/0252577 A1* | 9/2013 | Jordan | .................... | H04W 4/26 455/406 |
| 2014/0272049 A1* | 9/2014 | Azzano | ............... | A47J 31/4403 426/433 |

* cited by examiner

*Primary Examiner* — Allyson N Trail

(57) ABSTRACT

An electrical distribution center includes a plurality of electrical receptacles or ports which are activated when currency is deposited into a currency receiving mechanism that is coupled to a timer switch. Electricity is provided to the receptacles for a pre-paid period of time. Thereafter, the timer switch opens to prohibit further flow of electricity to the receptacles until additional currency is deposited or credited to the electrical distribution center. The electrical distribution center may be connected to an electrical grid or include an electricity generating source such as a solar panel and associated control circuitry.

8 Claims, 13 Drawing Sheets

ELECTRO HOT SPOT VENDING MACHINE

The present application relates to U.S. Provisional Patent Application Ser. No. 62/178,503 filed on Apr. 13, 2015 and claims priority therefrom.

The present application was not subject to federal research and/or development funding.

TECHNICAL FIELD

Generally, the invention relates to an electrical distribution device comprising a plurality of receptacles for providing both alternating and direct current (AC/DC). Specifically, the invention is a vending machine that distributes metered electricity for use in powering small hand-held devices and/or charging electronic devices. Thus, the invention assists people that need a place to recharge their electrical devices. It should be noted that in the United States, electricity is traded or sold on the electrical grid in amounts of kilowatt/hours. In the present invention, metered electricity is to be sold in typical smaller increments of watts/minutes.

BACKGROUND OF THE INVENTION

Most households in the United States are connected to the electrical grid and receive a supply of electricity therefrom. However, with the continued reduction of coal usage in the production of electricity, the cost of electricity is rapidly increasing. Such cost increases tend to push the budget of fixed-income families, which may result in these families being driven from the electricity marketplace because they are unable to pay a monthly electric bill. As most depend on a cellular telephone or other electrical device to remain in contact with their loved ones, they may need to borrow electricity from others. This tends to inconvenience others and is not a long-term solution to living without reliable electricity.

In third world countries, there may be no electrical grid. Or, the electrical grid may be unreliable and experience frequent failures. Moreover, many foreign countries have grids which only periodically provide electricity. That is, the electrical grids in these countries may only operate for a few hours each day and do not provide electricity constantly. It is an aim of the instant invention to provide an electrical distribution center for those who are in need of electricity but not connected to a reliable electrical grid.

There are a variety of devices that have be utilized in distributing electricity. By way of example, the following devices exemplify such devices. U.S. Pat. No. 3,637,059 to Schmidt discloses a coin-operated electric power supply station. A coin-operated electric power supply station is especially adapted for use in remote unsupervised locations. The station includes a substantially vandal proof metal box having one or more removable walls which are positively locked in place by a key-operated lock. The control elements of the station are mounted on the interior side of the removable wall so as to be readily accessible for repair. When the box is closed, only an actuating handle, a coin slot and an electric power outlet are accessible from the exterior of the box.

U.S. Pat. No. 3,986,114 to Hare discloses a watt-hour counter. A watt-hour counter for supplying electrical energy at a remote location from an external power source having a housing with a connection to an external source of electrical power, at least one electrical output mounted externally in the housing and a current measuring means serially connected between the external power source and the electrical output, for producing an output potential proportional to the current at the electrical output. A rechargeable coulometer is coupled to the output of the current measuring means, so that the current sensing means removes a predetermined magnitude of charge from the coulometer proportional to the ampere-seconds used in the external power lines. There is also a charging circuit coupled to the coulometer for charging the coulometer with a predetermined charge, and a switch means serially connected between the external power source and the output, and coupled to the coulometer for interrupting the power to the output in response to a change in potential of the coulometer.

U.S. Pat. No. 4,184,580 to Ellis Jr. discloses a coin operated battery charger and charging system check. The invention includes a structure for fast charging six or twelve volt storage batteries from a compact coin operated station. In addition, it is also provided herein to check the charging system and voltage output in any vehicle associated with a six or twelve volt battery. Besides the checking capabilities mentioned above, this system is also suitable for checking the starting system, and the battery itself.

U.S. Pat. No. 4,289,226 to Wilkinson discloses an electric vehicle battery recharging station. A parking meter-type apparatus recharges the batteries of an electric vehicle when parked. The apparatus includes an electric outlet socket, connected with a municipal source of electrical energy, connectable with a vehicle mounted battery charger. The apparatus is manually actuated after inserting a coin for dispensing a predetermined quantity of electrical energy.

U.S. Pat. No. 4,532,418 to Meese et al. discloses a microprocessor electric vehicle charging and parking meter system structure and method of charging an electric vehicle at a parking location and facilitating billing for the charging energy utilized and the parking time. The structure includes a charging and parking meter at a parking space for receiving a charge card and into which a charging plug from an electric vehicle may be placed, structure for reading the charge card placed in the meter and for locking the plug in place, and a central processor unit for determining the charging energy used and parking time and for storing billing data relative thereto at a remote location, for periodic removal to facilitate billing. The method of the invention includes the steps of permitting charging of an electric vehicle at a parking location in response to use of a charge card and storing charging and parking information for subsequent retrieval to facilitate billing to the owner of the charge card.

U.S. Pat. No. 5,272,431 to Nee discloses an automatic power connector for recharging electric vehicles. The invention supplies electricity to a recharger used to recharge batteries in a battery-powered vehicle. An arm mechanism is attached to the vehicle and moveable relative to the vehicle. At the distal end of the arm is an electrical plug protected by a retractable sheath and electrically connected to the recharger. A docking station located remote from the vehicle, emitting light and containing a conical passageway for guiding the plug to the outlet. A docker attached to the vehicle, containing optical sensors tuned to the light emitted by the docking station. Software instructions move the arm mechanism to seek the outlet, calculate the position of the outlet, and move the arm mechanism to connect the plug to the outlet. Software instructions activate the electrical supply to the outlet if the vehicle is authorized to receive electricity.

U.S. Pat. No. 5,423,407 to Nikolic discloses systems for providing electrical power in response to deposited coins. A system for providing electrical power in response to deposited coins comprising a mounting post secured to the ground, an input head secured at the upper extent of the mounting post, the input head including a plurality of slots for the receipt of coins to be used for the electrical usage to be provided, a plurality of readouts on the input head, an output module located on the post beneath the input head, the output module including a pair of receptacles, the first electrical receptacle adapted for the receipt of a 110 volt plug with a grounding component and the second electrical receptacle adapted for the receipt of a 220 volt plug with a grounding component as well as horizontal and vertical legs and a microprocessor responsive to the inserted coins for illuminating the readouts for indicating information as a function of the coins deposited such as time, money and voltage as well as an output device for supplying voltage for the selected time and voltage.

U.S. Pat. No. 5,544,784 to Malaspina discloses a rechargeable battery vending machine. A vending machine for vending a rechargeable battery pack has an interface unit, new battery reservoir, battery dispensing unit, and a control unit. A customer interested in purchasing a new battery insets a payment in the money handling unit. A display is provided and prompts the customer for a response. The customer responds by use of an entry pad, and the machine dispenses a new battery. Alternatively, if the customer is interested in exchanging a discharged battery for a fully charged one of similar condition, a battery pack received unit is provided with a receiver port for the customer to insert the spent battery. The spent battery is quickly analyzed by a battery test unit and assigned a grade. If the spent battery is in usable condition, it is passed to a battery recharger, and the customer is prompted to choose between a new battery and one of similar grade to that deposited. If a new battery is selected, one is dispensed, as before. If a similar battery is requested, then one is located in the recharged battery reservoir, and dispensed. The price charged to the customer is proportional to the difference in grade between the battery deposited and the battery dispensed. If the battery is in an unusable condition, the customer may choose to have it returned, or may choose for the machine to retain the battery in an internal recycle bin so that the battery may be collected for recycling. Additionally, the machine may have a communications relay station mounted on it for short range wireless communications systems.

U.S. Pat. No. 5,631,536 to Tseng discloses a rechargeable battery vending apparatus. A battery recharging apparatus is specifically configured to enable a customer to exchange a discharged or partially discharged battery for a fully charged replacement. Operator-assisted and entirely automatic vending versions are disclosed. In all embodiments, a controller causes a multiple port charger to recharge one or more batteries electrically connected thereto, preferably using a time multiplexing scheme. In the operator-assisted embodiment, an attendant inputs information concerning the customer, the vehicle, or the battery, and accounting-related functions are carried out through an interface to an electric cash register or some other payment-related facility. In the automated alternative of the invention, the apparatus is entirely self-contained within an enclosure including an access panel or window through which a user may deposit a battery in turn for a fully charged unit. Alternatively, the user may simply purchase a new, fully charged battery or battery pack. In this automated version a control panel accepts customer related information such as vehicle number, battery number or license plate number, the control panel further including means to accept a payment, whether in cash or through a reader of a standard credit card or card dedicated to the use of the invention. The vending machine is preferably constructed in modular form such that additional customer access areas may be disposed around the carousel so as to service more than one individual at a time.

U.S. Pat. No. 5,744,933 to Inoue et al. discloses a vending machine for charging a secondary battery of a mobile phone. A vending machine for charging a secondary battery of a mobile phone is provided with a plurality of charging blocks, each conforming to a specification of a mobile phone and a secondary battery of the mobile phone, for charging plural kinds of secondary batteries used in plural kinds of mobile phones, charging time selection buttons for instructing a charging time corresponding to each of the plurality of charging blocks, lock/unlock mechanism for locking/unlocking a key on a door provided in each of the plurality of charging blocks, a stocker for receiving at least one coin and/or at least one banknote, a calculator for calculating an amount of money of said coin and/or bill which have been received in the stocker, and a charging control circuit for controlling each of the plurality of charging blocks to charge a secondary battery of a mobile phone attached in one of the plurality of charging blocks, in accordance with the amount of money calculated by the calculator and the charging time instructed by the selection buttons.

U.S. Pat. No. 5,812,643 to Schelberg, et al discloses a power and telecommunications access vending machine. A vending machine for dispensing power and telecommunications access is disclosed. The vending machine has a switchable power circuit that receives power from a power source and delivers the power to the customer's equipment via a power connector under the control of a central control unit. A customer interested in purchasing power or using the telecommunications access makes a payment into the payment processing unit which forwards the payment information to the central control unit. From time to time the central control unit reports the transaction information to a central computer system via its modem which is connected to a telecommunication channel. Access to the same telecommunication channel or another channel can be made available to the customer via a switchable telecommunications access circuit which is also under the control of the central control unit. The customer connects to the telecommunications channel via the telecommunications access connector. The central control unit provides information on the progress of the vending transaction to the customer via the user interface. The central control unit determines when the transaction is completed by sensing the cessation of power usage via the power usage detection circuit or via customer action at the user interface.

U.S. Pat. No. 6,977,341 to Ronald discloses an apparatus for utility outlet control. The device for utility outlet control is provided that includes means for selectively blocking access to a utility outlet by way of disengaging or engaging the outlet blocking means. The outlet is blocked from access when the outlet is not being used. A user may gain access to the outlet upon appropriate payment or by an authorized access key. Typical utility outlets controllable by the present invention include, but are not limited to electric utility outlets, telephone utility outlets, and Internet access utility outlets.

U.S. Pat. No. 8,718,717 to Vaknin et al. discloses a public cellular telephone charging station. The public cellular telephone charging station is a publicly accessible charging system for cellular telephones and other portable devices. The charging station includes a housing and a support for supporting the housing on a support surface. At least one receptacle is provided within the housing for receiving at least one cellular telephone to be charged. Circuits, which include a timer, are disposed within the housing. A charging system for charging the at least one cellular telephone is further provided, with the charge time being calculated by the circuits and being measured and controlled by the timer. At least one charging port is located within the at least one receptacle for releasable connection to, and charging of, the at least one cellular telephone.

U.S. Pat. No. 8,904,198 to Pinto et al. discloses an electrical device recharging kiosk assembly. A electrical device recharging kiosk assembly includes a housing that has a top wall, a bottom wall and a perimeter wall attached to and extending between the top and bottom walls. The housing has a plurality of storage spaces therein for holding an electronic device. Each of the storage spaces includes an opening extending through the perimeter wall, a compartment aligned with and accessible through the opening, a door for closing the opening to the compartment, and a lock to lock the door. A charging implement for recharging a battery of the electronic device is positioned within the compartment. A control is mounted on the housing and is electrically coupled to the lock of each of the storage spaces. The control unlocks a door of one of the storage spaces to allow access to a selected one of the storage spaces and to the charging implement positioned therein.

U.S. Publication No. 2005/0104555 to Simmonds-Short discloses a secure recharge station. A recharge station is provided where users can deposit devices for recharging, and the mobile devices are held by a security system such that unauthorized removal is prevented.

U.S. Publication No. 2006/0229112 to Forro discloses a cellular telephone charging station and method. An apparatus and method is disclosed for allowing a user to charge the battery(s) within a cellular telephone. According to one aspect of the invention, an interface is provided for receiving a payment from a user. In response thereto, a timer is set to operate for a period to time that is based on the amount of the payment. During the time period, a power source is operated for charging the cellular telephone battery via a cord having a connector on at least one end. In accordance with another aspect of the invention, a method is provided. The method includes receiving a payment and, in response thereto, setting a timer to count for an amount of time. The method also includes providing an electrical output suitable for charging at least one cellular telephone battery, and disabling the electrical output when the timer reaches the set amount of time.

U.S. Publication No. 2007/0045411 to Honingford et al. discloses pay for use power outlet. A pay for use power outlet may include a housing and a power management system disposed within the housing. An electrical receptacle or ground fault interrupt plug may also be positioned on the housing or remotely from the housing to provide a user with a source of electrical current.

U.S. Publication No. 2009/0014460 to Joseph et al. discloses a mobile self-contained power vending station and method. A system for charging a power source of an electronic device includes a mobile self-contained power vending station that includes a central processor, a payment processing device, a DC power source, a DC to AC power inverter, and an AC outlet. The central processor, after detecting a valid payment from the payment processing device activates the DC to AC power Inverter thereby providing electricity to the power source of the electronic device via the AC outlet.

U.S. Publication No. 2010/0228687 to Lewis, Jr. discloses electricity vending devices and associated methods. Electricity vending devices and methods and software for vending electrical power are disclosed. Payment information may be received by the electricity vending devices by way of a magnetic or electric card reader, a fingerprint scanner, a retinal scanner, a keypad, a touchscreen, or an RFID detector.

U.S. Publication No. 2010/0174629 to Taylor et al. discloses a metered Delivery of Wireless Power. A system is disclosed for charging or billing for access to wireless power. The device requiring power communicates with the power provider and the billing method is determined. A consumer may be required to provide billing information, or if the billing information is already associated with an existing account, the consumer account is automatically charged for the wireless power. The account may include prepaid charging minutes that are debited as wireless power is provided, or the account may be billed for the wireless power that is provided. The charging/billing for the wireless power may be used to receive value for the power that is provided, while remaining consumer friendly.

U.S. Publication No. 2012/0078413 to Baker, Jr. discloses a secured electrical recharging facility method and apparatus. An electrical device recharging facility and method of operating the same is disclosed in which the facility includes a number of storage units having a locking mechanism operated according to a security access system and a number of power outlets and/or power cords arranged within the storage unit for recharging an electrical device.

U.S. Publication No. 2013/0030991 to Neidlinger et al. discloses a telecommunications initiated pay per charge system. A system and method for recharging a battery of a mobile device for a fee authorized by a financial account control server can include a battery recharging station having at least one recharging connection for a mobile device. The battery recharging station can be in communication with an electronic data connection for selective activation and deactivation of power supplied to the at least one recharging connection for recharging a battery of a mobile device. A recharging service control server can be operable to remotely control activation and deactivation of power supplied to the at least one recharging connection located at the battery recharging station through the electronic data connection in response to receipt of communication from the financial account control server regarding validation and acceptance of payment by a user of the battery recharging station.

U.S. Publication No. 2013/0132307 to Phelps discloses a device that manages the use of secure compartments in charging stations for portable electronic devices. The disclosed embodiments provide a charging station for portable electronic devices. During operation, the charging station obtains input from a user to the charging station. If the input matches an ongoing transaction associated with charging of the portable electronic device by the charging station, the charging station uses the input to identify a first secure compartment of the charging station containing the portable electronic device, wherein power is supplied to the portable electronic device within the first secure compartment. Next, the charging station releases a first door of the first secure compartment. Finally, upon detecting a presence of the portable electronic device in the first secure compartment after the first door is subsequently closed, the charging station secures the first door and continues to supply power to the portable electronic device without requiring additional input from the user.

U.S. Publication No. 2013/0335027 to Xin discloses a secure mobile electronic device servicing kiosk. A compact mobile electronic device servicing kiosk which provides speed charging and UV sterilization services to at least one mobile electronic device locked in at least one compartment. To achieve key-less access to the compartments, an interactive computing interface keeps temporary records of authentication characteristics collected from authentication means such as a biometric device or a payment device for compartment access authorization. The interactive computing interface also serves as multimedia content display and user interaction device. The interactive computing interface is wireless accessible to local area network or to the Internet which enables download and upload content from and to various external sources as well as enabling remote control for operation and maintenance purposes. Given the security and mobility features, the kiosk fits perfectly in any public locations where users can conveniently obtain a quick service without having to wait in front of the kiosk during the service session.

SUMMARY OF THE INVENTION

The instant invention is an electrical distribution box that includes a uniquely-shaped metal housing and which distributes electricity to an electrical outlet or charging cord only after the user has prepaid for a selected amount the electricity. The user is allowed to access metered electricity through a receptacle arranged within the distribution box. The user is allowed to connect a device or power cord to the internally arranged power receptacle. Electricity is thereafter distributed through the outlet via the power cord for the preselected amount of time. The receptacle connects to a power source via a timer switch which controls the closing and opening of a relay connected between the power source and the receptacle. The power source may be coupled to an electrical grid or may comprise an independent electrical generation device such as solar cells, wind turbines, or a micro-hydro electrical generator. Disconnect devices are provided for separating the distribution box from the power source such that the distribution box may be serviced. Over current protection devices are provided in series between the power source and the charging receptacles to prevent an overload condition which may damage the power distribution box or any devices or equipment connected thereto.

In one instance, a currency accepting device includes a coin slot, a bill acceptor and card reader. It should be noted that a variety of models of the electrical distribution box may be provided. Some of these models may include only a single one of the various currency acceptors mentioned above. The currency accepting device is coupled to a timer switch that is activated to provide both ac and dc to a respective receptacle for a period of time corresponding to the amount of currency that has been deposited into the currency accepting device of the electrical distribution box. The timer switch opens to disconnect the power source from the charging receptacles when the paid for time expires.

A signal representative of the amount of currency deposited into the electrical distribution box is routed to a microprocessor. The timer mentioned above may be included on the microprocessor to control the amount of time which the charging receptacle is powered.

Battery storage may be included in the power distribution box for storing electricity to assure charging capability even when the electrical grid is down. Otherwise, the batteries may be coupled to a solar panel or other electrical producing device for later use. If the electrical distribution box is connected to the electrical grid, then a rectifier is provided for converting the alternating current of the electrical grid into direct current and stepped down to create a low dc voltage for charging cell phones and other personal handheld devices.

It is an object of the invention to provide an electrical distribution box having a plurality of receptacles which are controlled to dispense a metered amount of electricity according to payments deposited into a currency acceptor.

Additional objects and advantages of the invention will be set forth in part in the description which follows, and in part will be obvious from the description, or may be learned from practicing the invention. The objects and advantages of the invention will be obtained by means of instrumentalities in combinations particularly pointed out in the appended claims.

DETAILED DESCRIPTION OF THE INVENTION

Figure 1A:
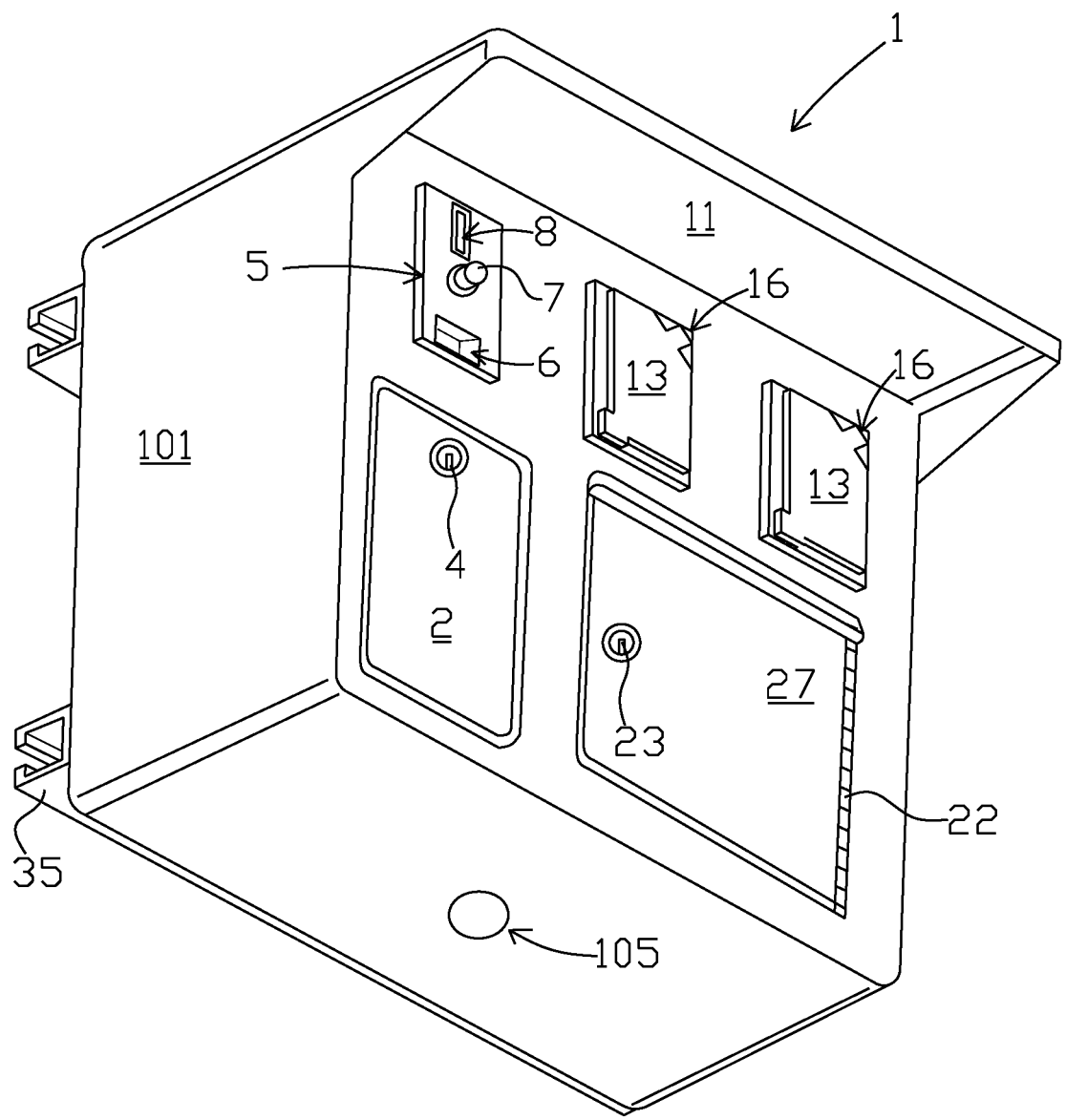
FIG. 1A shows a perspective view of a first embodiment of the invention.
Figure 1B:
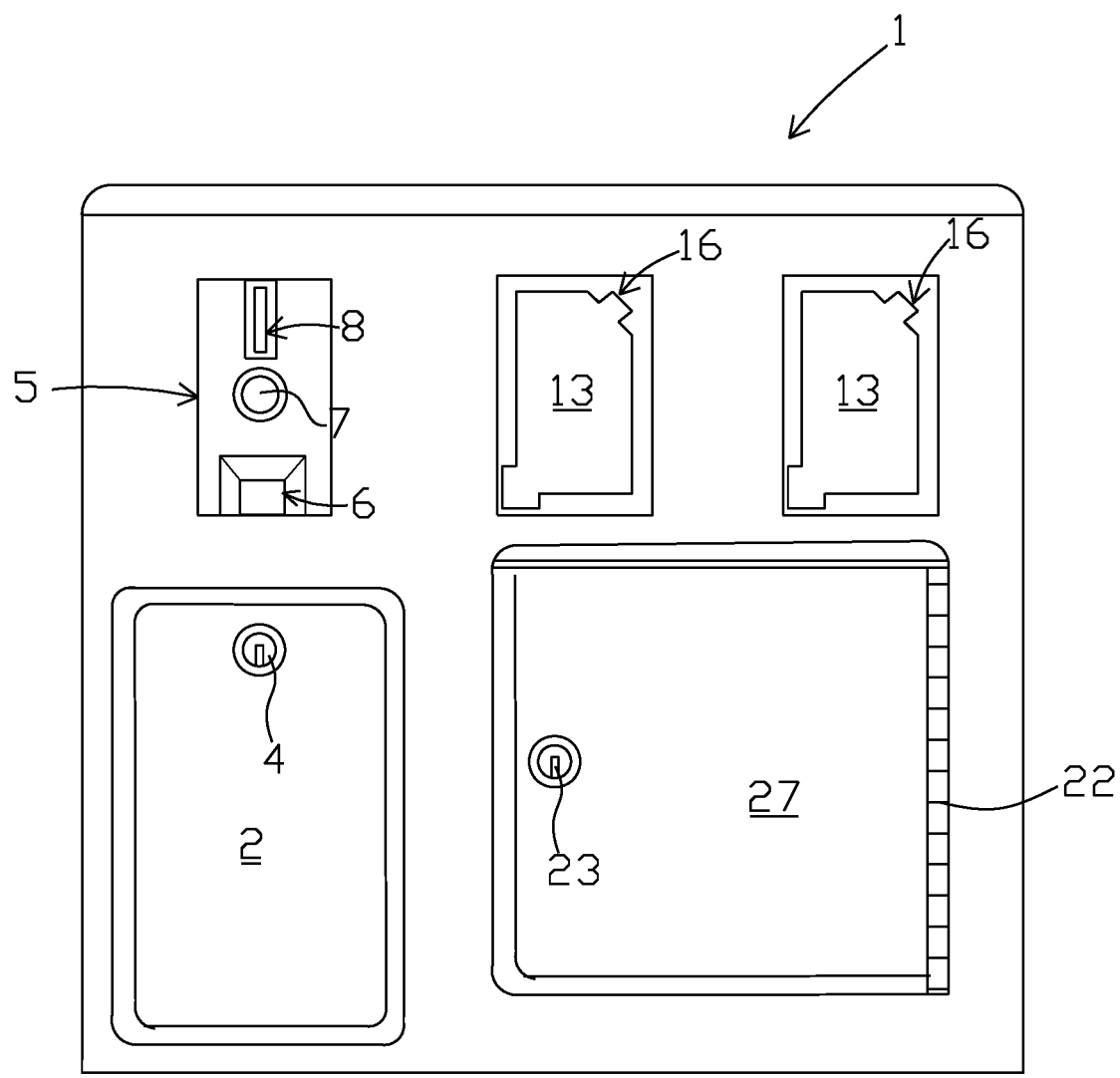
FIG. 1B shows a front view of the first embodiment of the invention.
Figure 1C:
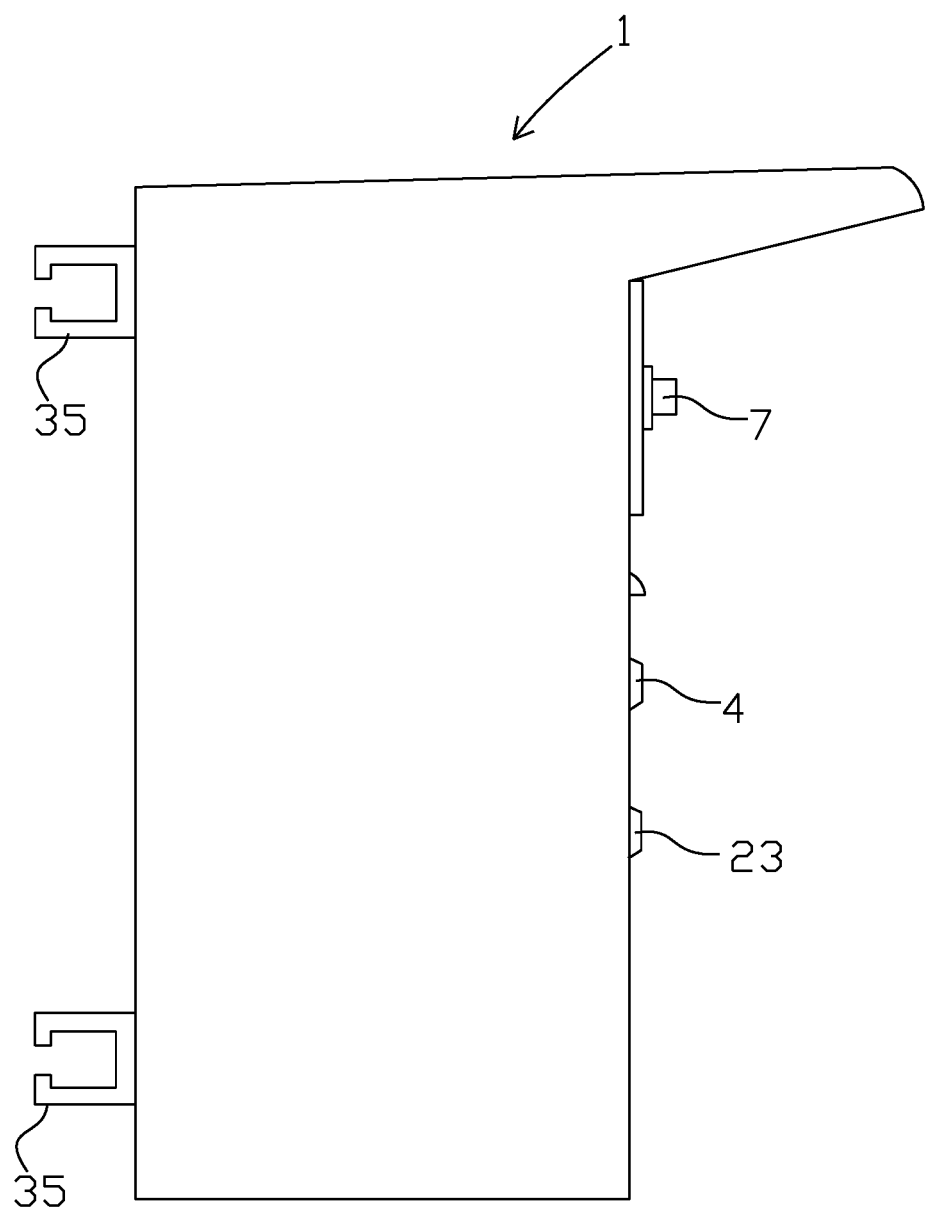
FIG. 1C shows a side view of the first embodiment.
Figure 1D:
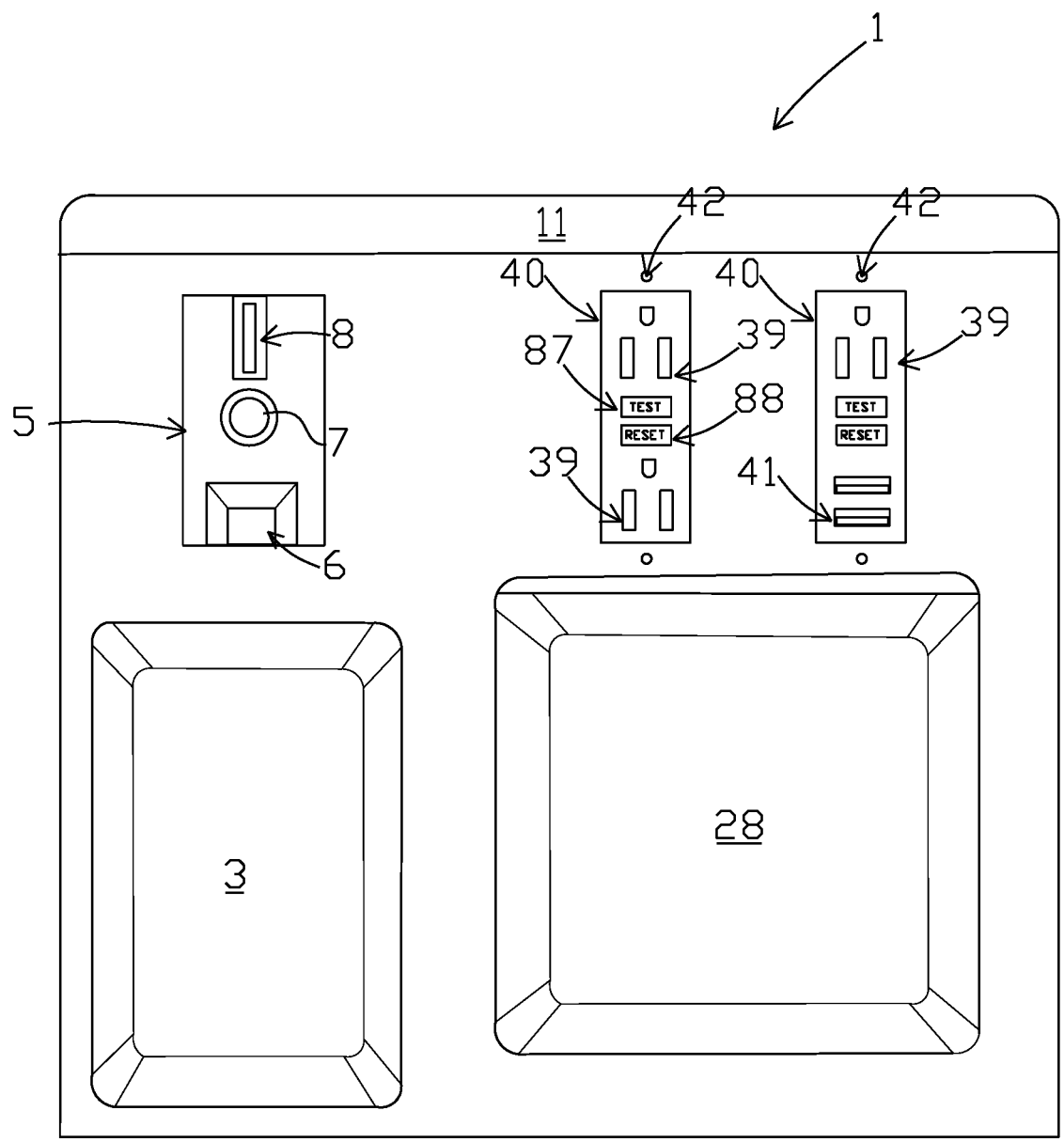
FIG. 1D shows the first embodiment with the receptacle covers removed.

The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings. It should be noted that the location of the various parts described herein may be arranged in different locations on or about the machine without deviating from the scope of this invention.

In the first embodiment, as represented by FIGS. 1A-1G, the invention comprises a vending machine from which electricity is sold. The vending machine 1 includes a front side of an outer casing or housing 10 that includes a coin acceptor 5, a pair of timed receptacles 39 covered by respective weather proof covers 13, a coin retrieval door 2 that opens into a currency storage recess 3, and a security locker door 27 which opens into a recess that forms a security locker 28 which allows cellular telephones and other small hand-held devices to be deposited and left unattended during a charging operation. The security locker door 27 is fastened to the front side of the outer casing via a hinge 22. A keyed-lock 23 is provided along a side of the security locker door 27 opposite the hinge 22. The weather proof receptacle covers 13 are mounted in openings 40 and coupled to the front side 1 via respective spring-loaded hinges 16. The receptacles 39 are protected by ground fault circuit interrupters and each include one 120 VAC outlet which may receive a male end of a power cord. Each receptacle is mounted to the front of the casing via a pair of openings 42 which may also serve to secure the covers 13 onto the front of the casing to seal the receptacles 39 from the weather. A pair of Universal Serial Bus connectors 41 is arranged at a lower end of each receptacle for accepting USB plugs to provide direct current for charging devices. An overhang 21 extends over the security locker door 27 to allow for a power cord to be routed between the door 27 and overhang 21, if the device being charged is deposited into the security locker 28. A knock-out opening 105 is provided on the bottom and back of the housing for removal and insertion of a power cable which connects to the vending machine 1 to a power sources such as the electrical grid. The knock-out opening 105 is an indentation that is pressed into the metal casing and which may be easily removed with a punching tool and a striking tool. Thereafter, a conduit or cable connector is fastened in the opening for securing the power cable and providing stress relief on the electrical conductors of the power cable.

The coin acceptor 5 includes a coin slot 8 through which coins are deposited to energize the receptacles 39 for a prepaid period of time. A coin return button 7 is arranged beneath the coin slot 8. The coin return button 7 causes the device to return any unused coins back to the user via a coin return opening 6 located beneath the coin return button 7. A coin retrieval door 2 is provided through which coins that have been deposited in the currency storage recess 3 are removed. A coin box and its associated tray may be arranged behind the coin retrieval door 2 within the currency storage recess. The coin retrieval door 2 is removed by inserting and turning a key in the lock 4. The top 12 of the casing includes an overhang 11 which provides protection from falling weather. The receptacles include spring-loaded covers 13 which are biased closed. Each cover includes an opening through which or an edge over which an electrical cord may be routed. Mounting brackets 35 are provided along a back side of the device. The bottom and top edges are rounded as shown. As the metal is sharp, all edges are rounded on the casing, covers, etc. A test button 87 is provided on each receptacle along with a reset button 88 for testing and resetting the ground fault operation of each receptacle 39.

In the preferred embodiment, the front of overhang 11 is higher in elevation to drain any water atop the device away from the front area and may be sloped to one side to drain water away from any structure. A hangover 21 is provided above the locker opening and allows power cords to be connected to at one end to one of the receptacles 39 while being coupled to a device that is stowed in the recess of the security locker 28 for charging operations. That is, the overhang allows for a smart phone to stay plugged into one of the receptacles when it is stored in the security locker 28.

A security lock 23 is arranged on the security locker door 27. Each of the edges of the locker door 27 is rounded smooth to prevent injury to a user.

Figure 1E:
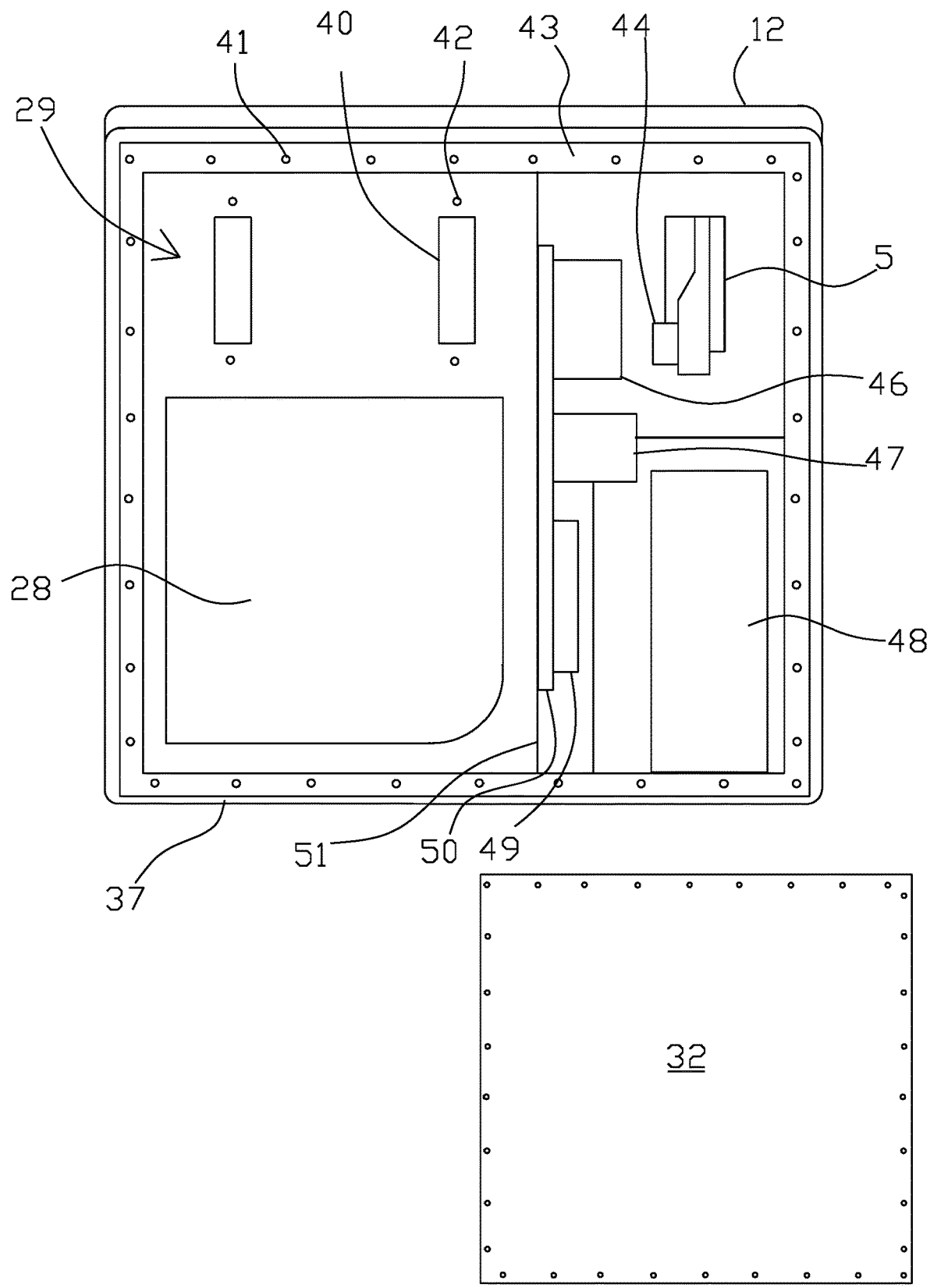
FIG. 1E shows an arrangement of parts taken from the rear.

Turning now to FIG. 1E which shows an arrangement of parts taken from the rear, the rear side of the casing of the device is removable to provide access to the innards of the machine through a rear access opening 29. The rear side of the housing 1 may be mounted to the remaining portion of the housing by a plurality of screws openings 41 provided in a countersunk lip 43 which surrounds the perimeter of the rear access opening 29. An exterior lip 37 surrounds the countersunk back panel 32 when it is mounted onto the housing. A micro-cherry switch 44 is mounted onto the coin acceptor 5. A coin counter 48 is mounted beneath the coin acceptor 5 and counts the denomination of each coin deposited. Timer 46, relay 47, and terminal strip 49 are mounted onto a mounting section 50 which in turn is mounted onto partition 51 which extends from the top to the bottom of the housing. If the electricity vending machine is to be mounted to a wall or other vertical planar surface, a pair mounting brackets 35 may be attached to a rear of the machine. Otherwise, the machine may be mounted on a pole. An electrical input supply opening is provide in a bottom, top, back or side of the casing and through which electrical supply is provided via a power cable.

Figure 1F:
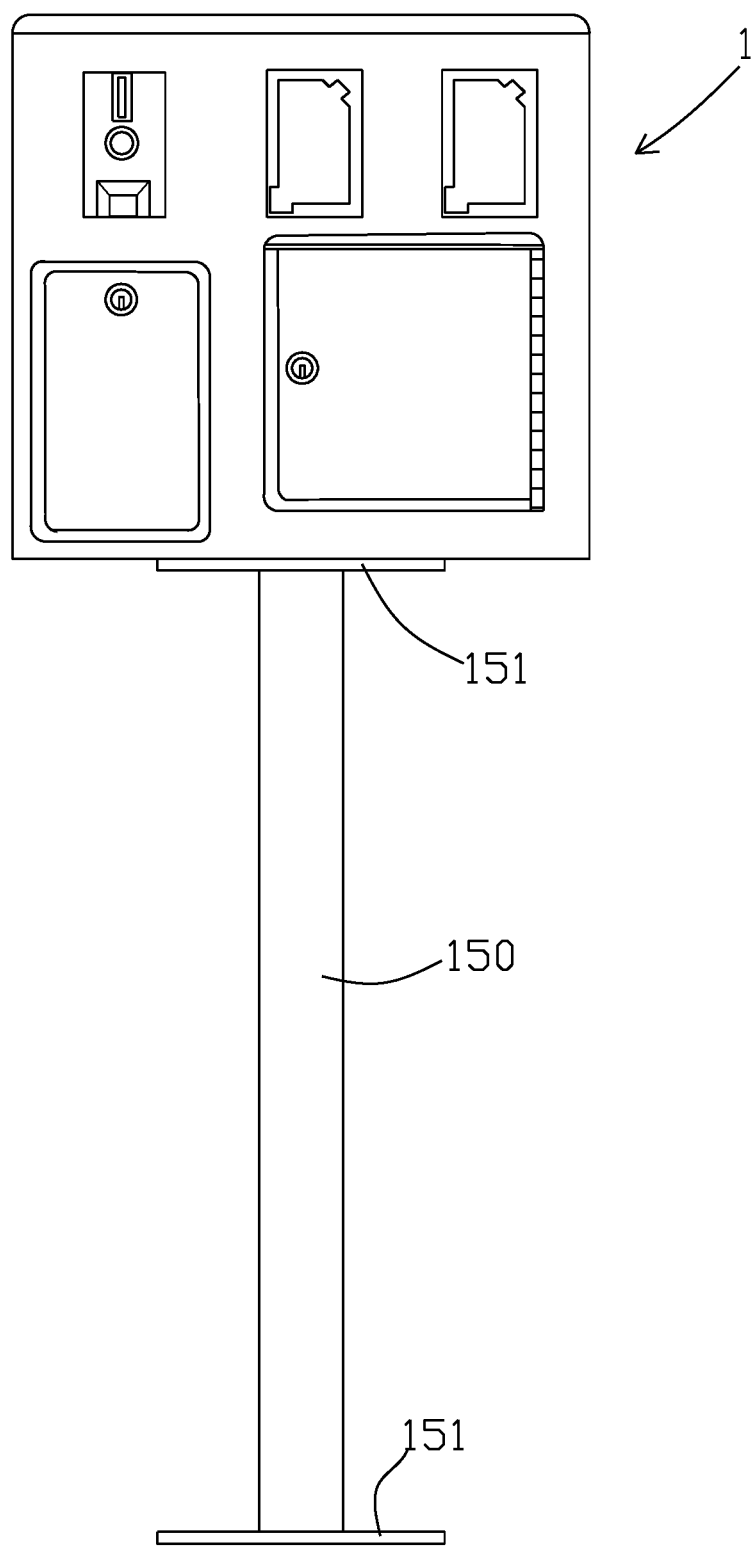
FIG. 1F shows the first embodiment of the invention mounted atop a pole.
Figure 1G:
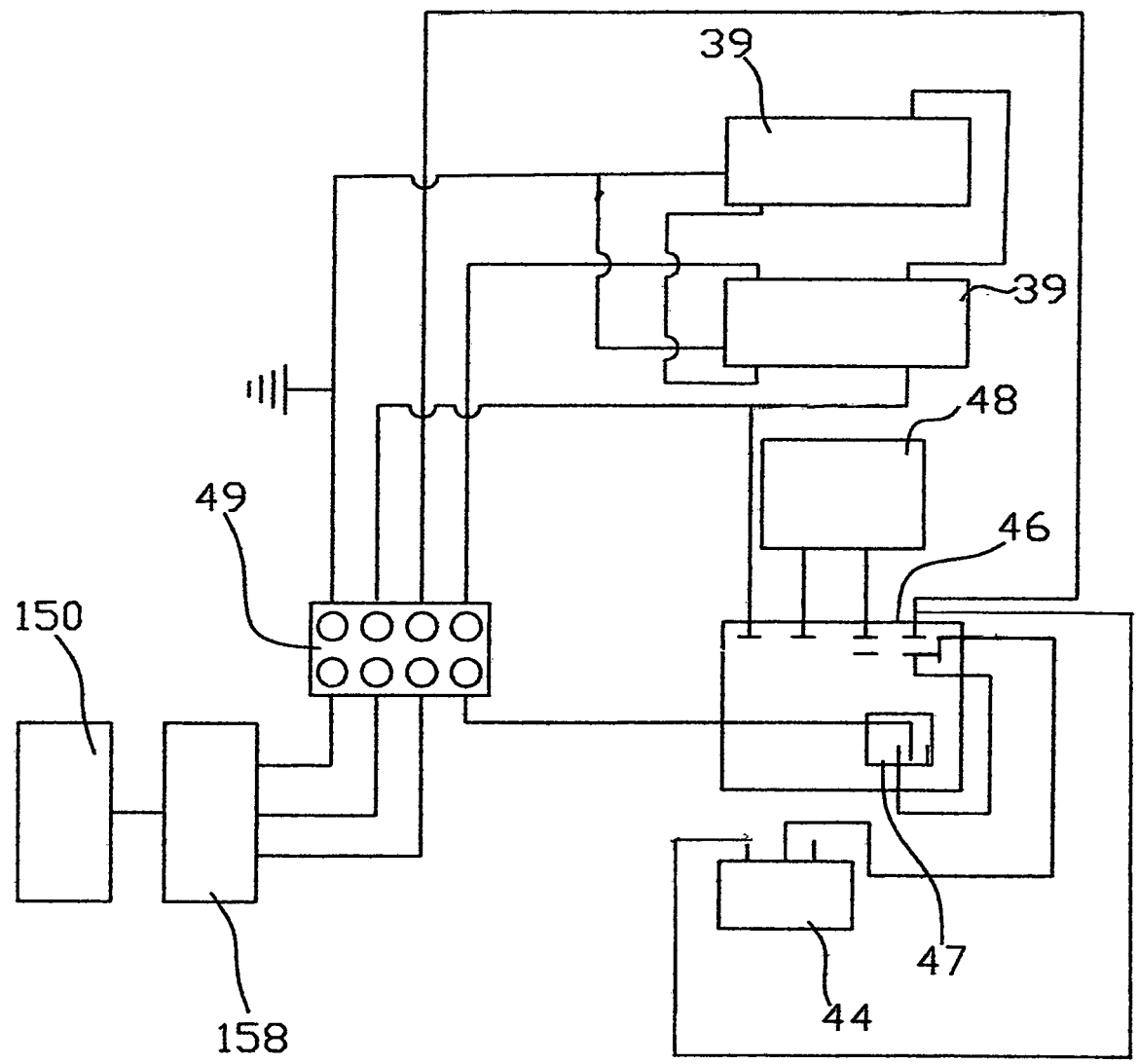
FIG. 1G is an electrical schematic of the first embodiment.
Figure 1H:
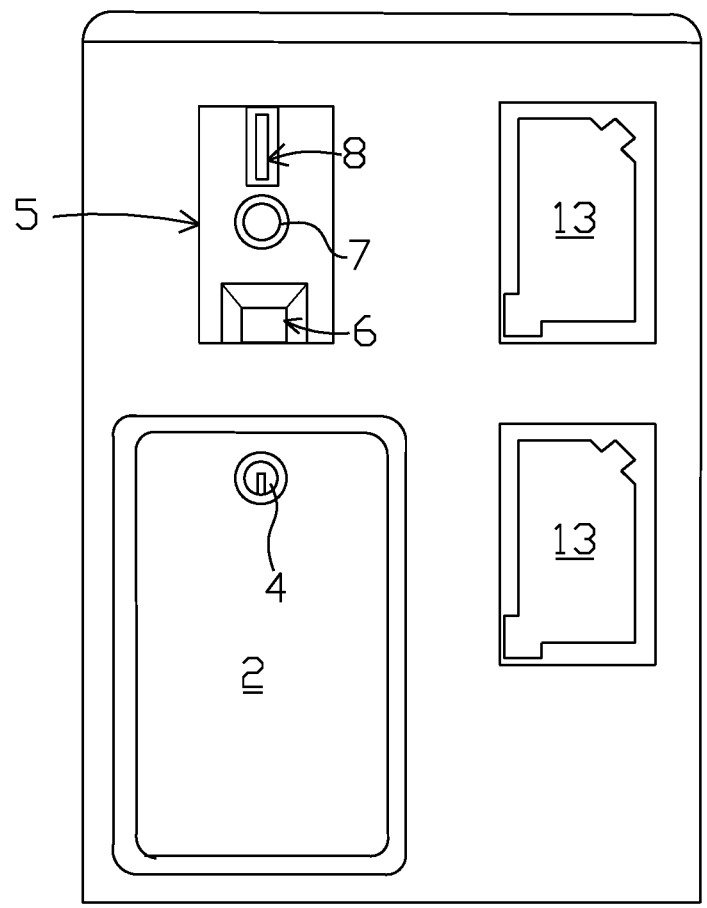
FIG. 1H is shows an embodiment wherein the GFCI receptacles are provided in a stacked arrangement with one above the other.

Turning now to FIG. 1G, which includes a basic electrical schematic of the present embodiment, which is supplied by an electrical grid such as that provided in the United States indicated as power source 150 which connects to the machine 1 via a service disconnect 185. The service disconnect 185 allows a user to de-energize the machine 1 prior to servicing it. In this instance, 120 VAC is routed onto a terminal bus 49 which includes at least four sets of terminals. The ground, neutral and hot wires are connected onto one side of a respective terminal. The ground is coupled to the metal casing of the machine and to the respective grounds on each receptacle 39 as well as a ground rod or the like. Likewise, the neutral wire is connected to the neutral on the GFCI protected receptacles 39. The hot wire is routed into a relay 47 which is energized when a coin is deposited into the machine and counted by the coin-counter 48 to provide electricity to the receptacles 39. A timer 46 and associated cherry micro switch 44 is provided for controlling the amount of time that the receptacles are energized.

It should be noted that in this instance, the receptacles include a circuit which provides 5 VDC to the USB portion of the receptacles. Such circuits may be known ones such as a Wheatstone Bridge, chopper circuit, voltage divider and associated diodes, capacitors or transformers or the like for stepping down and converting the 120 VAC to 5 VDC. These circuits could be provided external to the receptacles and the power supplying the USB may be coupled to separate inputs than the 120 VAC hot wire and may be turned on and controlled by the timer. However, in the preferred embodiment, the receptacles include the converting and stepping down circuits.

The casing may comprise a partition for mounting various parts mentioned above. The machine may be mounted atop a metal tube 150 as shown in FIG. 1F. In this instance, a pair of plates 151 is fastened on the top and the bottom of the tube. The top plate is fastened to the bottom of the casing and the bottom plate is fastened to a solid surface such as a base of concrete.

Figure 2A:
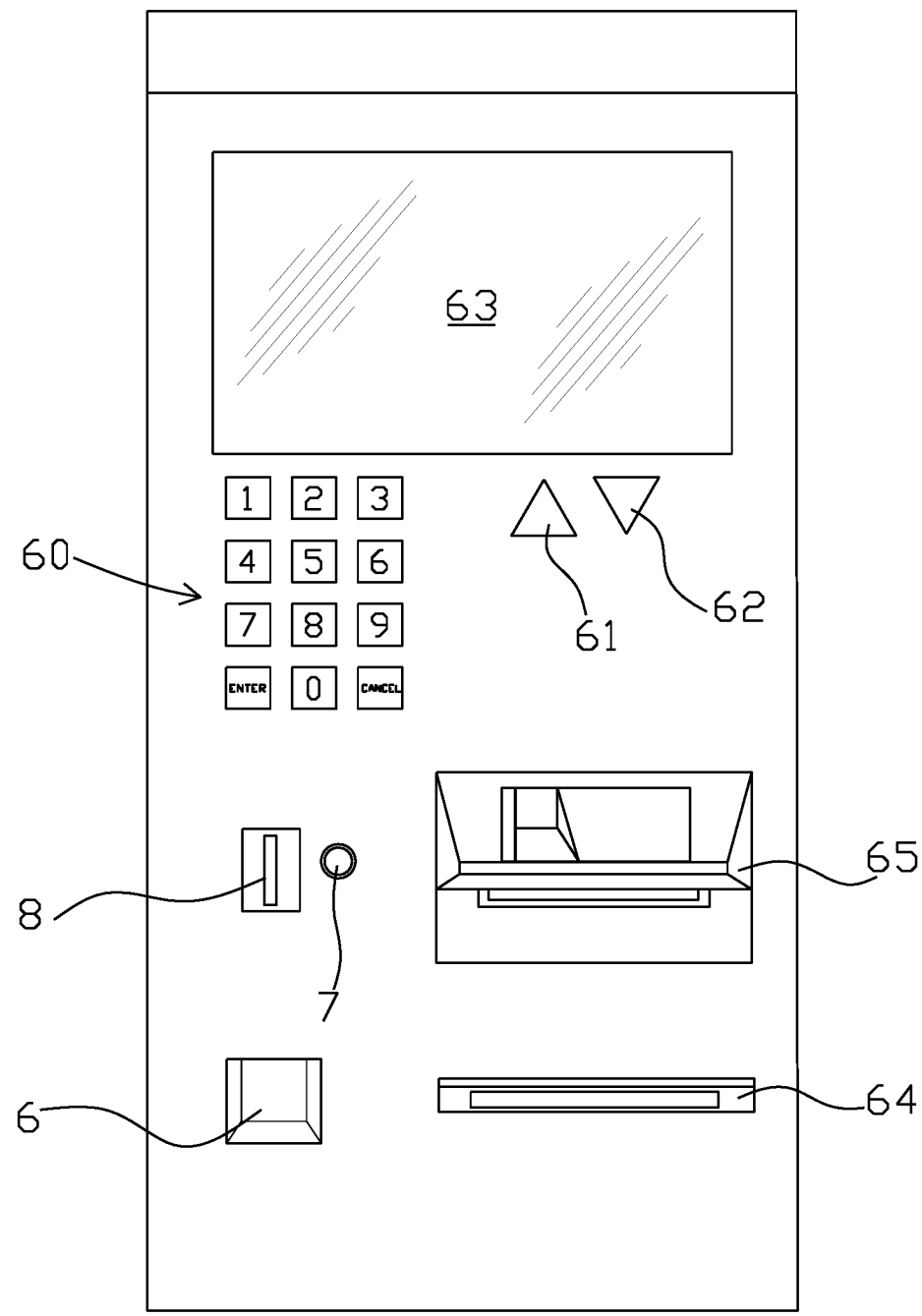
FIG. 2A shows a second embodiment of the invention.

FIG. 2A shows a second embodiment of the machine. In this instance, the machine includes a human interface comprising a keypad 60 with numbers 1 through 9 and having an up button 61 and down button 62 for toggling between options shown on the display 63. A coin slot 8, coin return button 7, and a coin return opening 6 are provided as in the first embodiment. A bill acceptor 64 and a card reader 65 is also provided for accepting both paper money and either a credit or debit card or the like. The bill acceptor 64 accepts money currency and credits the amount of electricity provided through the GFCI receptacles for a prepaid period of time. A card reader 65 allows a user to charge or debit the cost of the electricity to a credit card or debit card respectively. In this instance, the GFCI receptacles 39 are arranged on the side and may be accessed in similar fashion as mentioned above with respect to the first embodiment, as more clearly shown in FIG. 2B. Likewise, the GFCI receptacles 39 are selectively powered through a relay 47.

Figure 2B:
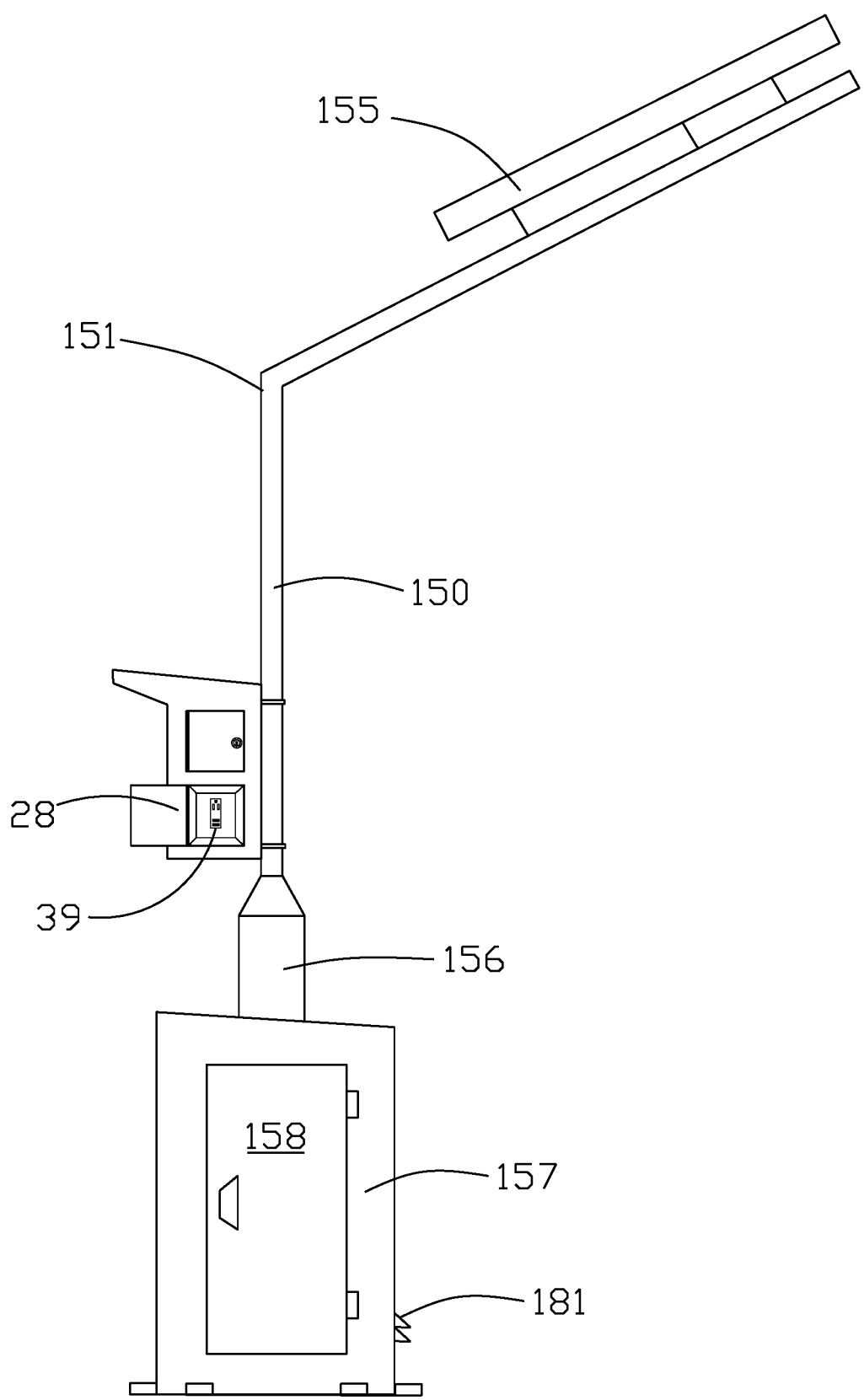
FIG. 2B shows the second embodiment mounted atop a pole and including a solar panel.
Figure 2C:
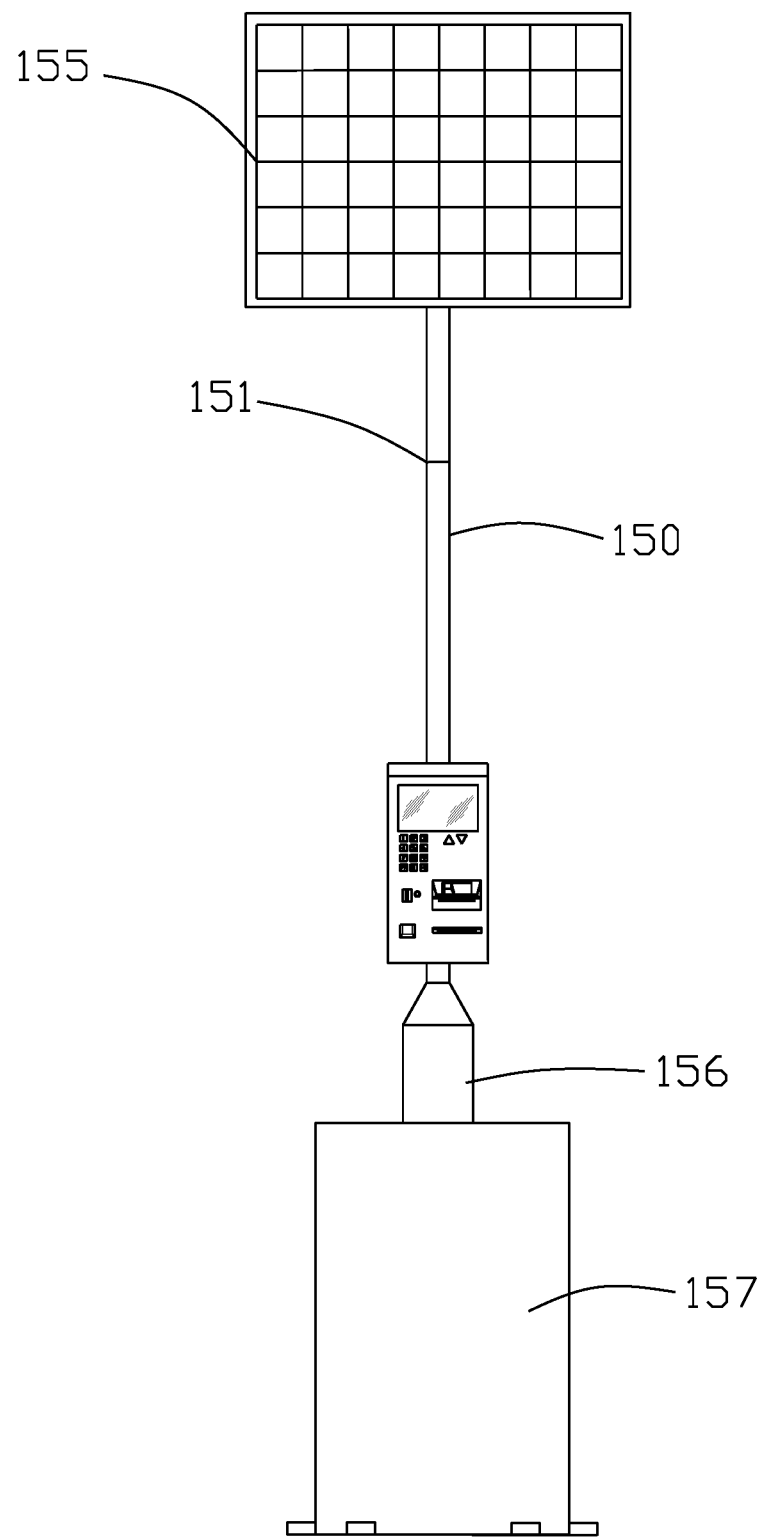
FIG. 2C shows a front view of the second embodiment.

FIG. 2B shows one embodiment of the invention fastened to a pole 150. The pole 150 includes a bend 151 and an upper portion to which a solar panel 155 is fastened. The bottom of the pole extends into a flared region 156 which fastens to a metal box 157 which houses batteries 175 that store electricity for use when the sun is not shining. A hinged door 158 is provided on the side of the box to provide access to the batteries 175. The box 157 is solidly fastened to the ground. In this instance, a receptacle 39 is arranged within the security locker 28. As in the first embodiment, each security locker 28 includes a door 27 through which access to the security locker 28 may be controlled through a microprocessor 95. Upon deposit of money, a random code is generated by the microprocessor 95 and assigned to an electronic lock register which corresponds to the control of the electronic lock. In this manner, the electronic lock arranged on the security locker door is disengaged when the randomly generated code is entered. That is, when the code that is currently stored in the electronic lock register of the microprocessor is entered into the machine via the keypad, the associated lock with a particular security locker is disengaged to unlock that security locker door. The user then opens the door, connects their device to the receptacle 39, and closes the door which is then locked until such time as the particular code is re-entered into the microprocessor via the keypad and display. Once the code is used to open the security locker twice, the code is then changed via a random number generator in the microprocessor and used by the next user in a similar fashion to open the security locker twice. FIG. 2C is a perspective front view of the second embodiment.

Figure 3:
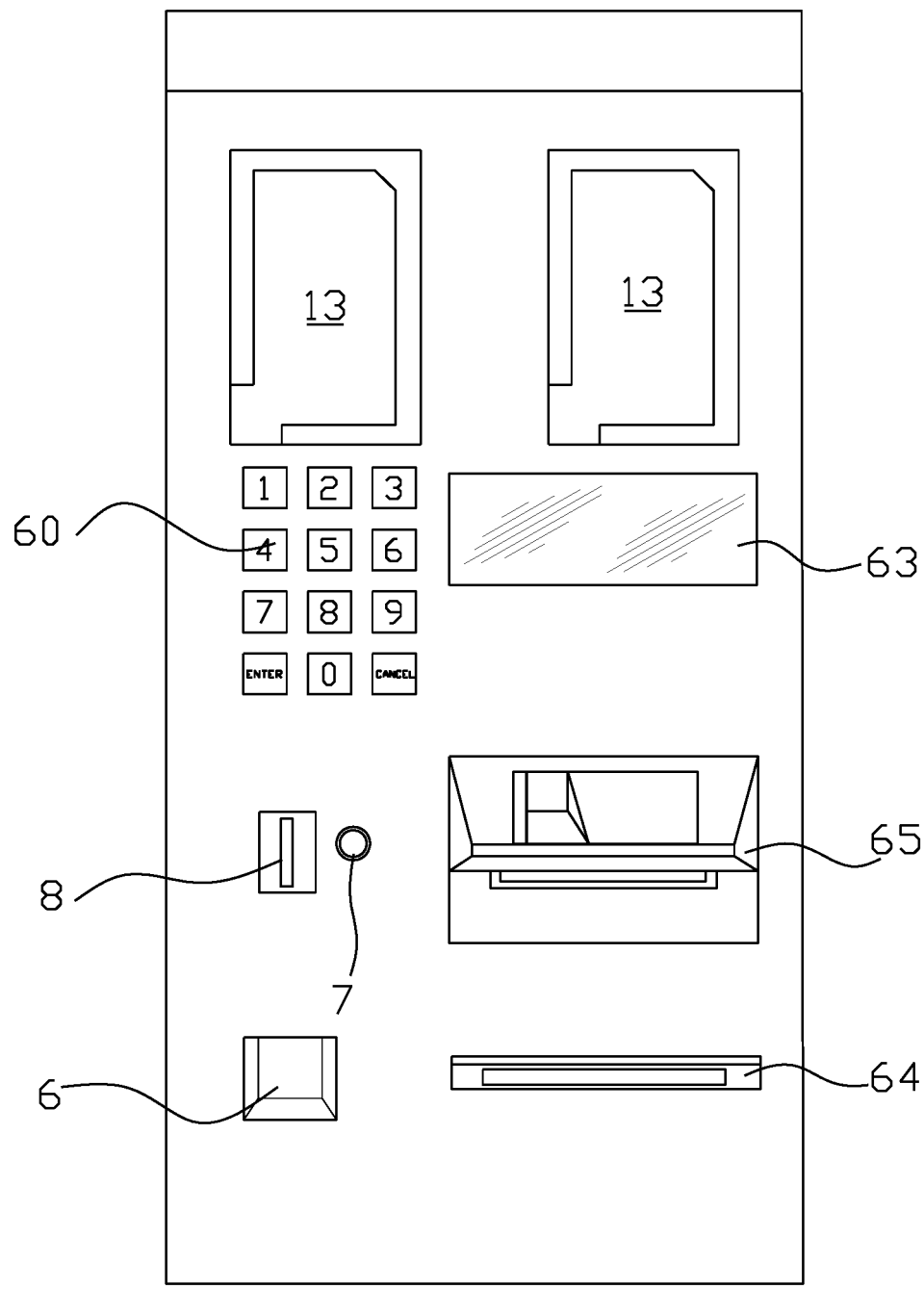
FIG. 3 shows a third embodiment of the invention.

FIG. 3 shows a third embodiment of the machine. In this instance, the keypad includes an enter button and a cancel button along with buttons representative of numbers 1-9. The GFCI receptacles and their associated spring-loaded covers are provided above the keypad 60 along with a display 63 and the respective currency accepting devices 8, 64, 65.

Figure 4:
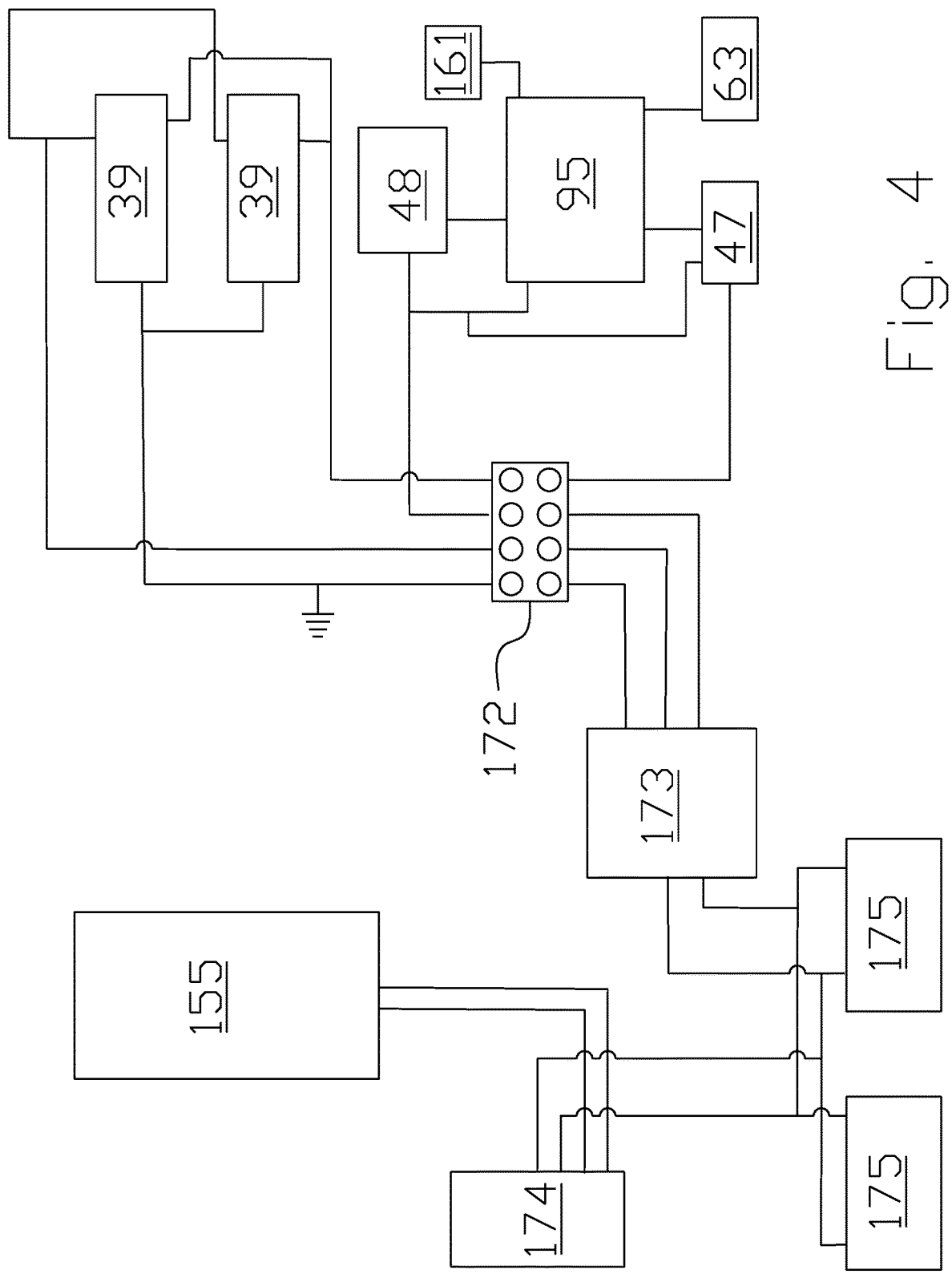
FIG. 4 shows a second electrical schematic of the invention.

FIG. 4 is a representative schematic showing a solar panel 155 coupled to a charge controller 174 and a pair of batteries 175. The solar panel 155 charges the batteries during the daylight hours while the sun is shining after which the energy stored in the batteries are utilized when at night or during overcast days. It should noted that the solar panel may be substituted for another power source such as the electrical grid. Energy from the batteries is converted from DC to AC in inverter 173. Electricity from the inverter 173 is routed to a terminal bar or bus 172. A neutral is connected to a first set of terminals. A ground is coupled to another set of terminals. A constant hot is routed to a third set of terminals. The last set of terminals is a controlled electricity which is only energized when relay 47 is on. This controlled electricity is timed in accord with the amount of currency that is deposited into the machine. For purposes of understanding, the coin counter 48 is only shown in this schematic. However, it is to be recognized that the bill acceptor 64 and card reader 65 are also connected to the microprocessor 95 for causing the GFCI receptacles to be energized in accord with an amount of currency deposited into, charged to, or debited to the microprocessor 95. The microprocessor 95 is connected to the display 63 for providing commands, passwords, or other data necessary to operate the machine 1.

It is to be understood that the invention is not limited to the exact construction illustrated and described above, but that various changes and modifications may be made without departing from the spirit and the scope of the invention as defined in the following claims. While the invention has been described with respect to preferred embodiments, it is intended that all matter contained in the above description or shown in the accompanying drawings shall be interpreted as illustrative and not in limiting sense. From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

I claim:

1. A vending machine from which electricity is sold and being connected to a power source, the vending machine comprising: a casing having a sloped top that forms an overhang which extends forward above a front side of the casing, the casing comprising a countersunk removable access panel secured to the casing via a plurality of screws, each screw extending through an opening arranged substantially near an outer edge of the countersunk removable access panel and each screw further extending into a countersunk lip which defines an opening that is covered by the countersunk removable access panel, the casing further including an exterior lip which surrounds the countersunk removable access panel; a coin acceptor having a coin slot through which coins are deposited to purchase electricity, the coin acceptor comprising a coin return button arranged beneath the coin slot and which is pushed to return coins, and the coin acceptor further comprising a coin return opening arranged beneath the coin return button; a currency storage recess formed in the casing beneath the coin acceptor and into which coins deposited into the coin acceptor are deposited; a coin retrieval door arranged on the front side of the casing, wherein the coin retrieval door opens into the currency storage recess to allow access into the currency storage recess; a second recess that forms a security locker which allows cellular telephones and portable hand-held devices to be deposited and left unattended during a charging operation, the security locker door opens into the security locker and is fastened to the front side of the outer casing via a hinge, the security locker door comprising a keyed-lock arranged along a side of the security locker door opposite the hinge; at least one timed receptacle covered by a weather proof cover and mounted in a receptacle opening in a front side of the casing, the weather proof cover coupled to the front side of the casing via a spring-loaded hinge; a microprocessor comprising a timer which receives input from the coin acceptor such that the timer is energized according to a denomination and amount of coins inserted into the coin acceptor and generating an output signal having a duration representative of the amount of coins accepted by the coin acceptor; a relay connecting the power source and the receptacle, the relay having a first input coupled to the timer that receives the output signal of the timer, the relay having a second input coupled to the power source and an output coupled to the at least one timed receptacle such that the relay is energized and connects the power source to the at least one timed receptacle when the relay receives an output signal from the timer; a timer switch which controls closing and opening of the relay; a terminal strip having a first side connected to a grounding wire, a neutral wire and constant hot wire of the power source and a second side that provides connection point to the grounding wire, the neutral wire, the constant hot wire and a switched hot wire; and, a service disconnect arranged between the terminal strip and the power source such that the service disconnect may be disengaged to allow service on the vending machine.

2. The vending machine of claim 1 wherein the at least one timed receptacle further comprises a ground fault circuit interrupter.

3. The vending machine of claim 1 wherein the at least one timed receptacle further comprises one 120 VAC outlet and a pair of Universal Serial Bus connectors arranged at a lower end of the at least one timed receptacle for accepting USB plugs to provide direct current for charging devices.

4. The vending machine of claim 1 wherein the front of the casing further comprises an overhang that extends over the security locker door to allow for a power cord to be routed between the door and overhang when a device being charged is deposited into the security locker.

5. A vending machine from which electricity is sold and being connected to a power source, the vending machine comprising: a casing having a sloped top that forms an overhang which extends forward above a front side of the casing, the casing comprising a countersunk removable access panel secured to the casing via a plurality of screws, each screw extending through an opening arranged substantially near an outer edge of the countersunk removable access panel and each screw further extending into a countersunk lip which defines an opening that is covered by the countersunk removable access panel, the casing further including an exterior lip which surrounds the countersunk removable access panel; a coin acceptor having a coin slot through which coins are deposited to purchase electricity, the coin acceptor comprising a coin return button arranged beneath the coin slot and which is pushed to return coins, and the coin acceptor further comprising a coin return opening arranged beneath the coin return button, the coin acceptor creating and outputting a signal representative of the amount and denomination of coins deposited into it; a currency storage recess formed in the casing beneath the coin acceptor and into which coins deposited into the coin acceptor are deposited; a coin retrieval door arranged on the front side of the casing and that opens into the currency storage recess to allow access into the currency storage recess; a second recess that forms a security locker which allows cellular telephones and portable hand-held devices to be deposited and left unattended during a charging operation; a security locker door which opens into the security locker and is fastened to the front side of the outer casing via a hinge, the security locker door comprising a keyed-lock arranged along a side of the security locker door opposite the hinge; at least one timed receptacle covered by a weather proof cover and mounted in a receptacle opening in a front side of the casing, the weather proof cover coupled to the front side of the casing via a spring-loaded hinge; a microprocessor comprising a timer which receives input from the coin acceptor such that the timer is energized according to a denomination and amount of coins inserted into the coin acceptor and generating an output signal having a duration representative of the amount of coins accepted by the coin acceptor; a display connected to the microprocessor which receives an output from microprocessor, wherein the output is shown on the display; a keypad comprising numbers 1 through 9 and having an up button and a down button for toggling between options shown on the display; a bill acceptor which accepts paper money and generates an output signal representative of the amount of paper money and forwards the output signal to the microprocessor; a card reader which accepts one of a credit card or debit card and outputs a signal to the microprocessor; a relay connecting the power source and the receptacle, the relay having a first input coupled to the microprocessor that receives the output signal of the timer, the relay having a second input coupled to the power source and an output coupled to the at least one timed receptacle such that the relay is energized and connects the power source to the at least one timed receptacle when the relay receives an output signal from the timer; a timer switch which controls closing and opening of the relay; a terminal strip having a first side connected to a grounding wire, a neutral wire and constant hot wire of the power source and a second side that provides connection point to the grounding wire, the neutral wire, the constant hot wire and a switched hot wire; and, a service disconnect arranged between the terminal strip and the power source such that the service disconnect may be disengaged to allow service on the vending machine.

6. The vending machine of claim 5 wherein the at least one timed receptacle further comprises a ground fault circuit interrupter.

7. The vending machine of claim 5 wherein the at least one timed receptacle further comprises one 120 VAC outlet and a pair of Universal Serial Bus connectors arranged at a lower end of the at least one timed receptacle for accepting USB plugs to provide direct current for charging devices.

8. The vending machine of claim 5 wherein the front of the casing further comprises an overhang that extends over the security locker door to allow for a power cord to be routed between the door and overhang if a device being charged is deposited into the security locker.

* * * * *